United States Patent [19]

Traynor

[11] 4,167,057

[45] Sep. 11, 1979

[54] DEVICE TO FACILITATE THE REMOVAL OF HOUSED OR BLOCKED BEARING ASSEMBLIES

[76] Inventor: Craig D. Traynor, R.F.D. #1, West Chazy, N.Y. 12992

[21] Appl. No.: 820,750

[22] Filed: Aug. 1, 1977

[51] Int. Cl.² .............................................. B25Q 1/00
[52] U.S. Cl. .................................................... 29/283
[58] Field of Search ................... 29/264, 263, 265, 283

[56] References Cited

U.S. PATENT DOCUMENTS

| 3,727,293 | 4/1973 | Phillips | 29/264 |
| 3,748,718 | 7/1973 | Russell | 29/264 |
| 3,781,963 | 1/1974 | Felser | 29/283 |
| 4,011,648 | 3/1977 | Martinson et al. | 29/264 |

*Primary Examiner*—James L. Jones, Jr.
*Attorney, Agent, or Firm*—Burns, Doane, Swecker & Mathis

[57] ABSTRACT

A puller device for the removal of ball or sleeve bearings from a shaft is disclosed. The puller device includes a split, self-locking unit constructed of a protruding sleeve for engaging an inner bearing race and an outer peripheral pulling flange for attachment to a conventional bearing puller tool. The two portions of the puller device are locked together by means of pairs of dowels and apertured arms which engage each other. The puller device permits the force required by a puller tool to detach a locked or frozen inner bearing race from a shaft or rubber isolating grommet in a bearing housing without direct puller tool force coming into contact with the bearing housing or bearing support assembly.

1 Claim, 6 Drawing Figures

DEVICE TO FACILITATE THE REMOVAL OF HOUSED OR BLOCKED BEARING ASSEMBLIES

BACKGROUND OF THE INVENTION

This invention relates to pulling tools in general and specifically to bearing pullers.

In the air conditioning and heating fields today, the state of the art utilizes many air handlers consisting of fan, filter and coil assemblies. The majority of all fan sections built by many different manufacturers are almost identical in the treatment of bearing placement and support method, as illustrated in details in FIGS. 3-6.

Due to the number of these fan systems being utilized, normal maintenance procedures would dictate that many of the fan bearings would require occasional replacement.

As a conventional puller tool is normally used to provide the removing force required, many fan systems are damaged by the puller action on the bearing housing or bearing housing support assembly.

Referring to FIG. 5, it is obvious that a standard puller tool, which is used to break loose the frozen or corroded contact area between the bearing inner race and the shaft or the area between the rubber isolation grommet and the bearing housing which is frozen to the aging and setting of the rubber isolation grommet 14, will contact the bearing housing 7 with the puller extension arms. This is a normal method of breaking a bearing loose which many times results in a damaged bearing housing 7 or a distorted bearing housing support assembly 8.

The puller device of the present invention eliminates the possibility of damaging the bearing housing or bearing housing support assembly during bearing removal by transmitting the necessary puller force, required to dislodge the bearing, directly to the inner race of the bearing without contacting the bearing housing or support assembly. This results in a much truer and more reliable maintenance technique.

INTENT OF THE INVENTION

It is the intention of this invention to provide a device to remove bearings from shafts by providing direct pulling effort, through the use of a conventional puller, on the point of resistance between a shaft and its bearing or between a bearing and its housing without otherwise attaching to or creating unnecessary force on the bearing housing or support assembly.

It is another intention of this device to provide a pulling tool device with a minimum number of parts.

It is another intention of this invention to provide a pulling tool device which is easily understood by maintenance personnel through its simplicity, and readily usable by its self-locking and non-precision easy fit.

It is another intention of this invention to provide a pulling tool device which is usable with many different combinations of shaft-bearing diameters by changing only the male and female puller sections.

It is another intention of this invention to provide a field usable pulling tool device which will remove the subject bearing while the entire fan-shroud-bearing etc., unit is still assembled, as illustrated in FIg. 3, and mounted in its original equipment-therefore minimal or no pre-bearing removal of fan or housing assemblies will be required.

NOMENCLATURE OF DRAWING NUMBERED ITEMS

1—Female puller section
2—Male puller section.
3—Integral dowel part of the male puller section.
4—Integral apertured arm of the female puller section.
5—Fan shaft.
6—Ball or sleeve bearing.
7—Bearing housing.
8—Bearing housing support assembly.
9—Fan shroud.

DESCRIPTION OF THE PREFERRED EMBODIMENT

Figure 1:
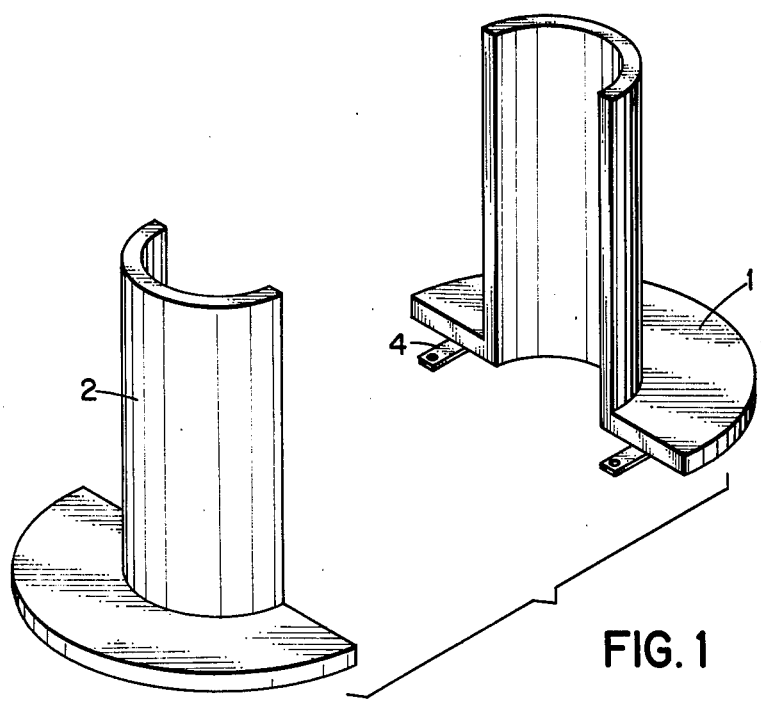
FIG. 1 is an exploded, perspective view, showing the two elements of the puller device.
Figure 2:
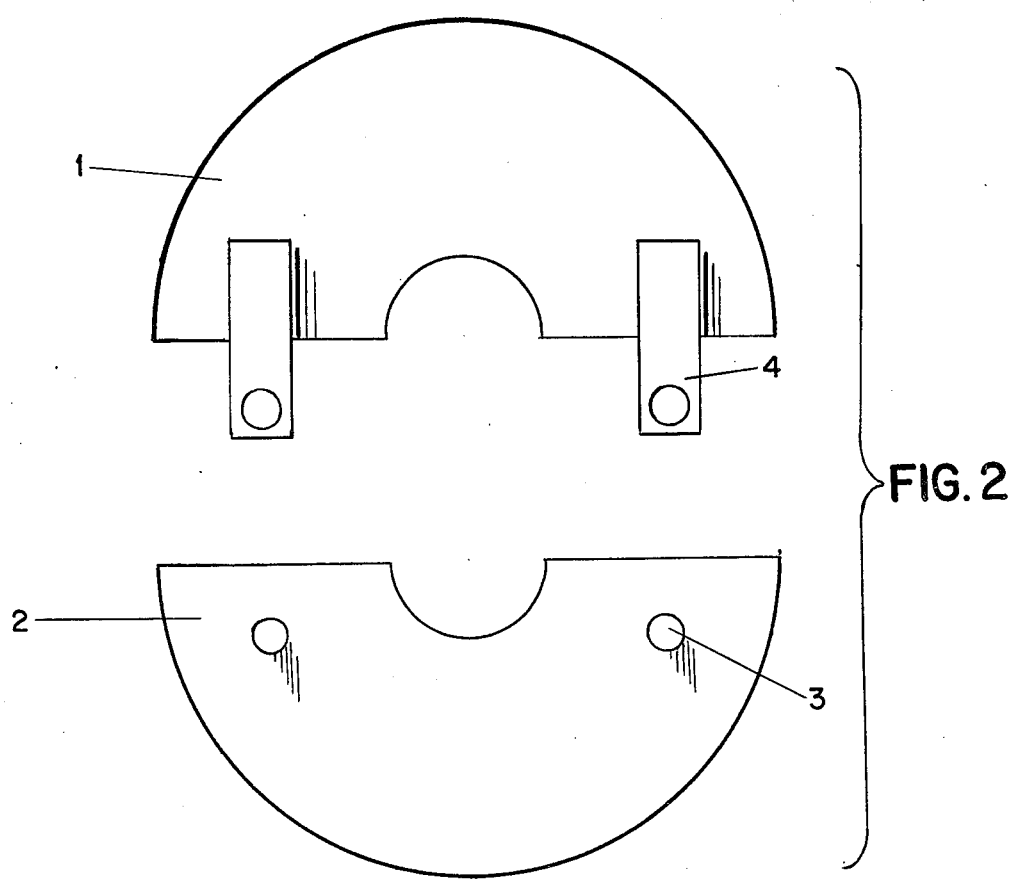
FIG. 2 is a rear unassembled view of the device showing the dowels of the male puller section.
Figure 3:
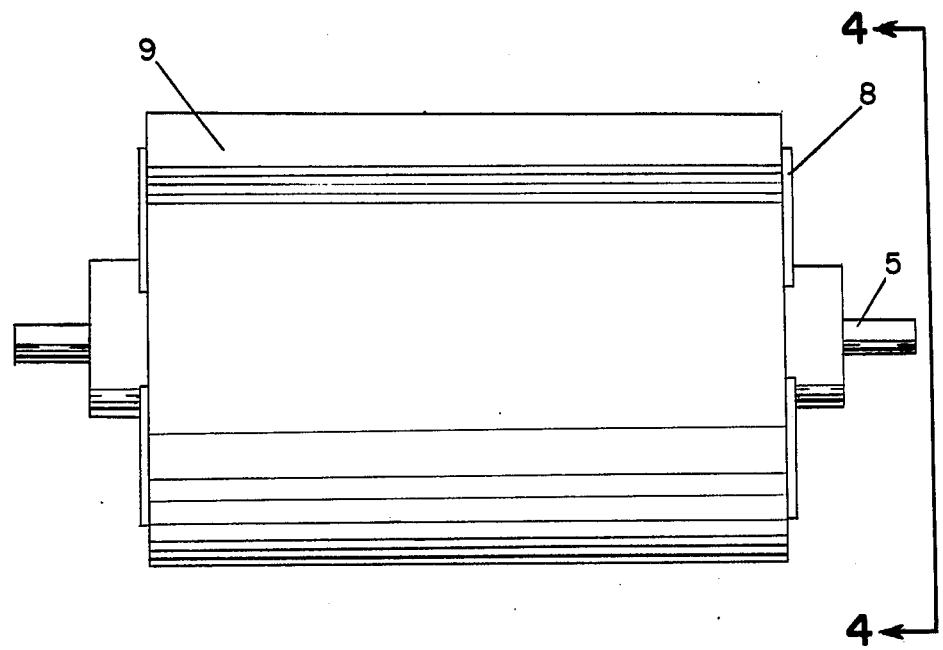
FIG. 3 is a rear view of a typical squirrel cage fan assembly.
Figure 4:
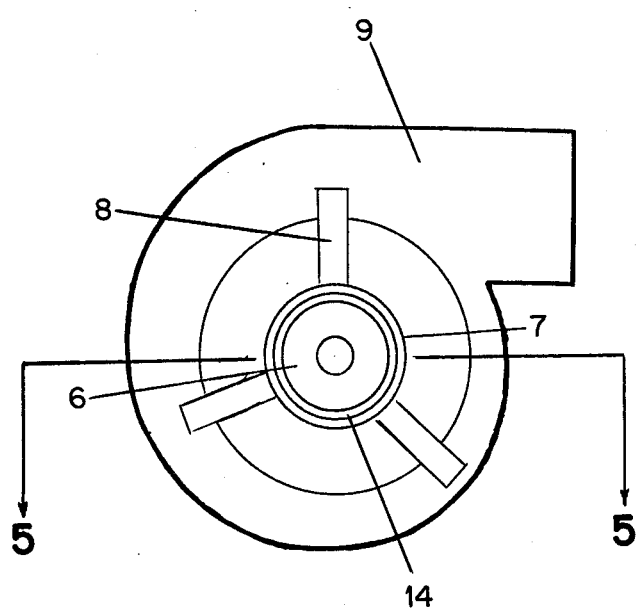
FIG. 4 is an end view of typical squirrel cage fan assembly looking in the direction of the arrows 4—4 of FIG. 3.

Referring now to FIg. 4, an end view of a typical fan-bearing-shaft arrangement is shown. Bearing locking rings and drive sheaves are omitted as they are not necessary components to the demonstration of the puller device. For the purpose of illustration, only this device will be shown as used in removing a ball bearing from a shaft. However, it should be understood that this device is usable, with necessary alterations, to other applications for disengaging a bearing or the like from a shaft. Referring again to the FIGS. 3-6, assume at this point that bearing 6 has become defective and requires replacement. Furthermore, it has been ascertained that the bearing inner race 11 has become bound, through corrosion, to the drive shaft 5. The air conditioning equipment, to which this fan system is a part, is roof-mounted and accessable by a mechanic with hand tools only. It is desirable to replace the ball bearing only, with the minimal amount of labor for disassembly and reassembly of air conditioning equipment, thereby reducing equipment down time by performing the necessary operations in situ, thereby reducing the equipment down time.

Figure 5:
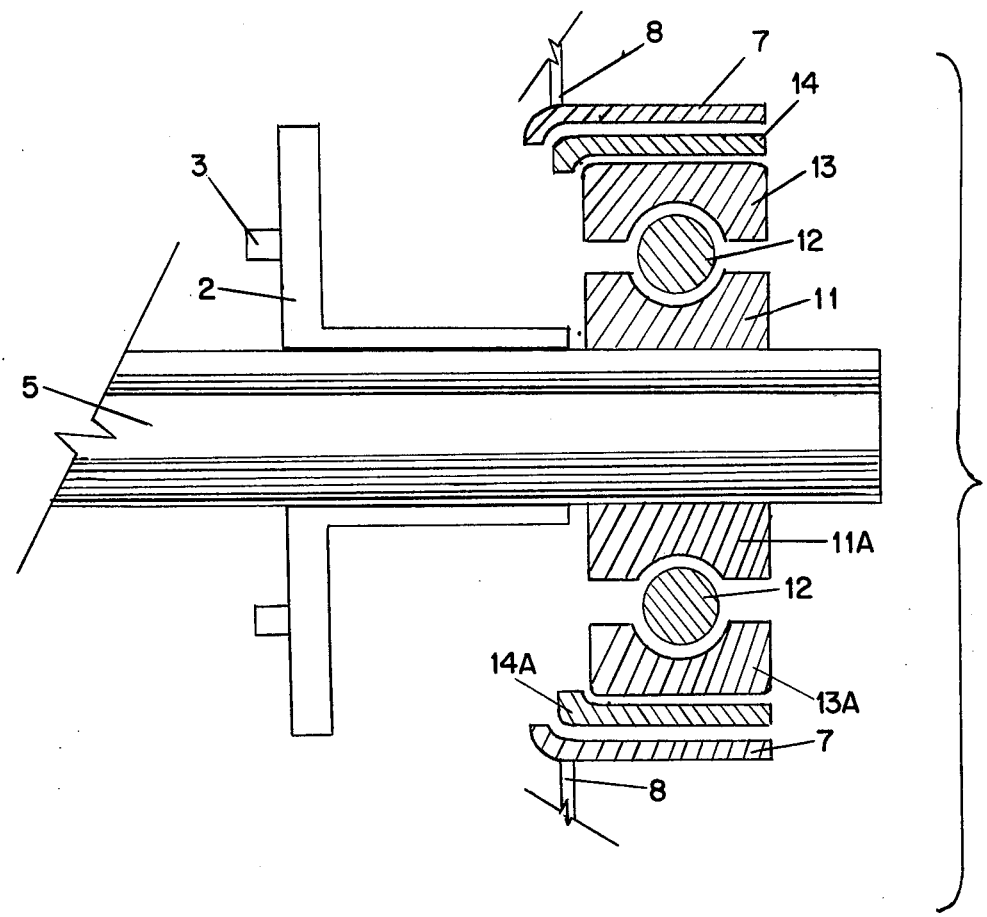
FIG. 5 is a cutaway sectional view of a fan bearing housing assembly approximately in the area of the arrows 5—5 of FIG. 4; showing the male puller section about to contact the inner bearing race of the bearing assembly.
Figure 6:
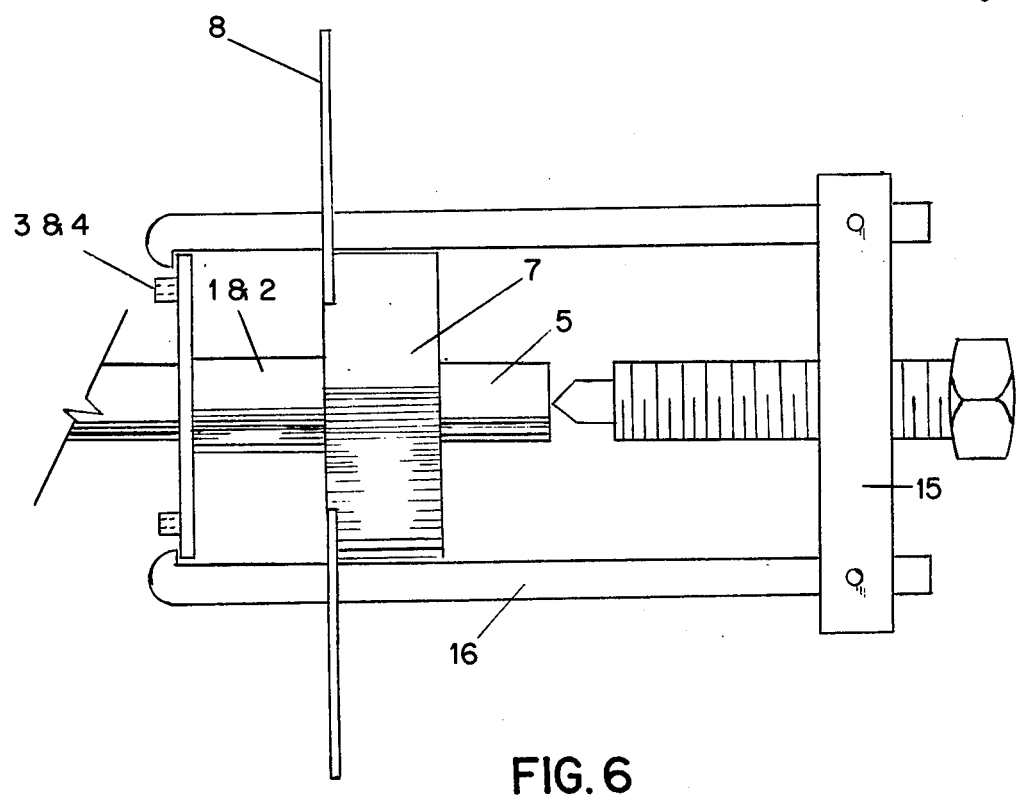
FIG. 6 is a side view of the assembled puller device shown exerting pressure on the inner race with pressure originating from the force of a conventional bearing puller tool.

Referring to FIG. 5 in general and the cut-away ofthe ball bearing unit in particular, note the extended rear lip of the bearing housing 7. Should the mechanic connect a conventional puller tool, such as shown at 15 in FIG. 6, to the shaft and attempt to pull the bearing, the puller extension arms would come into contact with the extended rear lip of the bearing housing 7, possibly damaging the bearing housing 7 or distorting the bearing housing support assembly 8.

In contemplation of the potential damage from a conventional puller alone, the puller device of the present invention can be used to prevent the unnecessary damage. As the bearing must be removed over the shaft end and the bearing housing configuration precludes travel of bearing any further toward the fan wheel, the split unit sections 1 and 2 are used to provide a puller device of simple design. The puller device is intentionally split into two sections 1 and 2 since a continuous ring or collar obviously cannot be installed externally over the shaft onto the shaft length between the bearing attachment to the shaft and the fan wheel attachment to the shaft. The male section 2 is inserted into the fan wheel between the bearing housing supports 8. The protruding sleeve is slipped over the shaft with the sleeve end resting against the ball bearing inner race, as shown in FIG. 5. Female section 1 is similarly inserted into the fan wheel symetrically opposed to the male section 2. The cylindrical sleeve of the female section is slid along the shaft until it comes into contact with the opposed side of the bearing race 11, simultaneously locking the male dowels 3 into the holes in the arms 4. At this point the complete assembly is friction locked, relieving the necessity of any further manual holding. The mechanic now attaches conventional puller tool 15 in the usual manner, locking the extension arms about the peripheral pulling flange of the puller device 1, 2.

The puller is now operated in the normal manner, exerting opposing forces on the (a) puller screw-shaft contact point and the (b) external periphery of the device. At this point note that the locking components 3 and 4 also prevent separation of the two sections 1 and 2 which would otherwise nullify the puller tool force transmission to the desired sleeve and inner race contact point. The rigid composition of the puller device transmits the extension arm periphery pulling flange force to the sleeve and inner race contact point. At this time, the force generated by the conventional puller is applied directly into breaking the bond between the inner race 11 and the shaft 5 with no direct force being applied either to the bearing housing 7 or bearing housing support assembly 8.

Additionally, many shaft elements are supported by pillow block bearing assemblies. Many of these units which, by design or construction material, do not lend themselves engageable or removable by the conventional puller thus lending their removal from the shaft directly to the intention of this invention.

It must be recognized that although only the general sense of the device has been herein described, many variations of standard puller or other manipulation of required puller force may be applied along with different dimensional units to embody a range of sizes and applications.

I claim:

1. A pulling device for removing housed or blocked bearing units from their shaft by transferring the pulling force of a conventional puller directly to the inner race-shaft joint without otherwise engaging the bearing mounting or housing unit, comprising: two half sleeve segments each including an outer peripheral pulling flange for engagement with a conventional puller and an integral inner sleeve for contacting the inner race, and means for locking said half sleeve segments about a shaft including a pair of dowels protruding from an outer surface of the flange of one of said half sleeve segments and a pair of extension arms attached to the flange of the other of the segments, each extension arm including an aperature for cooperating engagement with a dowel on said one half sleeve segment, whereby said segments are locked together on the side of the bearing opposite the conventional pulling unit and the inner sleeve is positioned against the bearing inner race by placing said half sleeve segments on diametrically opposite sides of the shaft and axially sliding the segments along the shaft relative to each other until the dowels are engaged within said apertures, to thereby enable a conventional puller with puller extension arms to be attached to the peripheral pulling flange to provide longitudinal pulling force to the peripheral pulling flange and thus to the inner race of the bearing to be removed to dislodge the bearing at the desired bearing-shaft joint without otherwise contacting the bearing housing or housing support assembly.

* * * * *

UNITED STATES PATENT AND TRADEMARK OFFICE
CERTIFICATE OF CORRECTION

PATENT NO. : 4,167,057
DATED : September 11, 1979
INVENTOR(S) : Craig D. Traynor It is certified that error appears in the above-identified patent and that said Letters Patent are hereby corrected as shown below:

In column 2, the following should appear after line 33 in the "NOMENCLATURE OF DRAWING NUMBERED ITEMS":

11 - Inner bearing race.
12 - Ball bearing.
13 - Outer bearing race.
14 - Rubber isolation grommet.
15 - Conventional bearing puller.
16 - Extension arm of the conventional bearing puller.

In column 2, lines 56-57, "thereby reducing equipment down time", should be deleted; line 60, "ofthe" should be --of the--.

In column 3, line 26, --16-- should be inserted after "arms".

Signed and Sealed this

Twentieth Day of November 1979

[SEAL]

Attest:

RUTH C. MASON
Attesting Officer

LUTRELLE F. PARKER
Acting Commissioner of Patents and Trademarks